United States Patent
Sugden

(10) Patent No.: US 9,355,452 B2
(45) Date of Patent: *May 31, 2016

(54) CAMERA AND SENSOR AUGMENTED REALITY TECHNIQUES

(71) Applicant: Microsoft Technology Licensing, LLC, Redmond, WA (US)

(72) Inventor: Benjamin J. Sugden, Surrey (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/577,532

(22) Filed: Dec. 19, 2014

(65) Prior Publication Data

US 2015/0103098 A1    Apr. 16, 2015

Related U.S. Application Data

(63) Continuation of application No. 13/078,425, filed on Apr. 1, 2011, now Pat. No. 8,937,663.

(51) Int. Cl.
| | |
|---|---|
| *G06T 7/00* | (2006.01) |
| *G06F 3/147* | (2006.01) |
| *G06T 19/00* | (2011.01) |
| *H04N 5/222* | (2006.01) |

(52) U.S. Cl.
CPC .............. *G06T 7/0044* (2013.01); *G06F 3/147* (2013.01); *G06T 7/0042* (2013.01); *G06T 19/006* (2013.01); *H04N 5/2224* (2013.01); *G06T 2207/10004* (2013.01); *G06T 2207/30204* (2013.01); *G06T 2207/30244* (2013.01); *G06T 2210/04* (2013.01)

(58) Field of Classification Search
CPC .................... G06K 9/00671; G06T 2215/16
USPC .......................... 348/51, 207.1, 333.01–333.06
See application file for complete search history.

(56) References Cited

U.S. PATENT DOCUMENTS

| | | | |
|---|---|---|---|
| 6,064,749 A | 5/2000 | Hirota et al. | |
| 7,002,551 B2 | 2/2006 | Azuma et al. | |
| 8,937,663 B2 | 1/2015 | Sugden | |
| 2003/0012410 A1 | 1/2003 | Navab et al. | |
| 2003/0210228 A1* | 11/2003 | Ebersole et al. | ............. 345/157 |
| 2004/0131232 A1 | 7/2004 | Meisner et al. | |
| 2004/0143176 A1* | 7/2004 | Foxlin | ......................... 600/395 |
| 2005/0123171 A1* | 6/2005 | Kobayashi | ............. G06F 3/011 382/103 |

(Continued)

OTHER PUBLICATIONS

"Final Office Action", U.S. Appl. No. 13/078,425, Jun. 20, 2014, 15 pages.

(Continued)

*Primary Examiner* — Mekonnen Dagnew
(74) *Attorney, Agent, or Firm* — Dan Choi; Judy Yee; Micky Minhas

(57) ABSTRACT

Camera and sensor augmented reality techniques are described. In one or more implementations, an optical basis is obtained that was generated from data obtained by a camera of a computing device and a sensor basis is obtained that was generated from data obtained from one or more sensors that are not a camera. The optical basis and the sensor basis describe a likely orientation or position of the camera and the one or more sensors, respectively, in a physical environment. The optical basis and the sensor basis are compared to verify the orientation or the position of the computing device in the physical environment.

20 Claims, 4 Drawing Sheets

(56) References Cited

U.S. PATENT DOCUMENTS

| | | | |
|---|---|---|---|
| 2007/0242086 A1 | 10/2007 | Tsujimoto et al. | |
| 2009/0073084 A1 | 3/2009 | Mullen | |
| 2009/0323121 A1* | 12/2009 | Valkenburg | G01B 11/002 358/1.18 |
| 2010/0194863 A1* | 8/2010 | Lopes et al. | 348/50 |
| 2010/0220173 A1* | 9/2010 | Anguelov | G06T 7/004 348/36 |
| 2012/0249586 A1* | 10/2012 | Wither et al. | 345/633 |
| 2012/0249807 A1 | 10/2012 | Sugden | |
| 2013/0064427 A1 | 3/2013 | Picard et al. | |

OTHER PUBLICATIONS

"Non-Final Office Action", U.S. Appl. No. 13/078,425, Feb. 13, 2014, 19 pages.

"Non-Final Office Action", U.S. Appl. No. 13/078,425, Jun. 20, 2013, 13 pages.

"Notice of Allowance", U.S. Appl. No. 13/078,425, Sep. 10, 2014, 6 pages.

Barandiaran, et al.,' "Real-time optical markerless tracking for augmented reality applications", Journal of Real-Time Image Processing, vol. 5, No. 2, Available at <http://www.springerlink.com/content/x281360862565132/fulltext.pdf>,2010, pp. 129-138.

Corrales, et al.,' "Hybrid Tracking of Human Operators using IMU/UWB Data Fusion by a Kalman Filter", In Proceedings of HRI 2008, Available at <http://rua.ua.es/dspace/bitstream/10045/10536/4/hri231-corrales.pdf>,2008, 8 pages.

Leydon, "Sensing the Position & Orientation of Hand-Held Objects: An Overview of Techniques", UL-CSIS-03-02, Available at <http://www.krispinleydon.net/pubs/handheld_tracking.pdf>,Dec. 3, 2001, pp. 1-15.

Reki Moto, et al.,' "CyberCode: Designing Augmented Reality Environments with Visual Tags", In Proceedings of DARE 2000, Available at <http://citeseer.ist.psu.edu/viewdoc/download;jsessionid=296CA79F575234F41D87FC3BDBD83B11?doi=10.1.1.37.126&rep=rep1&type=pdf>,2000, 10 pages.

You, et al.,' "Fusion of Vision and Gyro Tracking for Robust Augmented Reality Registration", In Proceedings of VR 2001, Available at <http://ieeexplore.ieee.org/stamp/stamp.jsp?tp=&arnumber=913772>,Mar. 17, 2001, 8 pages.

\* cited by examiner

CAMERA AND SENSOR AUGMENTED REALITY TECHNIQUES

RELATED APPLICATION

This application is a continuation of and claims priority to U.S. patent application Ser. No. 13/078,425 filed Apr. 1, 2011 entitled "Camera and Sensor Augmented Reality Techniques" the disclosure of which is incorporated by reference herein in its entirety.

BACKGROUND

Display techniques utilized by computing devices are ever evolving. For example, initial computing devices were provided with monochrome monitors. A user interacted with the computing device by viewing simple text on the monochrome monitor and entering text via a keyboard that could then be viewed on the monitor.

Display techniques were then expanded into use of color and graphical user interfaces. These techniques, for instance, may be utilized to show graphics to represent files, devices connected to the computing device, images, and so on using color. A user may then interact with the graphical user interface using the keyboard as well as by using a cursor control device, such as a mouse.

Display techniques have continued to evolve, such as through the use of glasses to view a three-dimensional television, use of virtual technology, and so on. However, complexities may arise in implementation of these techniques that may make the techniques difficult to implement by traditional computing devices.

SUMMARY

Camera and sensor augmented reality techniques are described. In one or more implementations, an optical basis is obtained that was generated from data obtained by a camera of a computing device and a sensor basis is obtained that was generated from data obtained from one or more sensors that are not a camera. The optical basis and the sensor basis describe a likely orientation or position of the camera and the one or more sensors, respectively, in a physical environment. The optical basis and the sensor basis are compared to verify the orientation or the position of the computing device in the physical environment.

In one or more implementations, a combined basis is calculated that describes a likely position or orientation of at least a part of a computing device using an optical basis computed from data received from a camera of the computing device and a sensor basis computed from data received from one or more sensors of the computing device. An augmentation is generated by the computing device for display as part of an augmented-reality display based at least in part on the combined basis.

In one or more implementations, an apparatus includes a camera, an inertial measurement unit (IMU), a display device, and one or more modules. The one or more modules are configured to compute an optical basis from data obtained by the camera and a sensor basis generated from data obtained from the inertial measurement unit (IMU), calculate a combined basis that describes a likely orientation or position of the camera and the inertial measurement unit (IMU) in a physical environment, and cause an augmented-reality display to be displayed by the display device, the augmented-reality display including an augmentation that was generated based at least in part on the combined basis.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Augmented reality techniques are described. Augmented reality techniques may be utilized to generate a view of a real world environment that is augmented using computer-generated outputs, such as sound or graphics. In this way, a user's view of the real world may include sensory inputs that were generated by a computing device and thus may augment a user's experience.

In the following discussion, augmented reality techniques are described that involve use of a camera and other sensors. For example, a camera may be utilized to capture an image of a physical environment of a computing device, such as a user's media room. The image may then be analyzed to locate markers that give an indication of a position and/or orientation of the camera in relation to the physical environment. Augmented-reality tags (AR tags), for instance, may be used to indicate a distance between the camera and the tags as well as an orientation in relation to the tags. In this way, the image may serve to compute an optical basis for determining an orientation and/or position of the camera in the physical environment. These techniques may also leverage other sensors to verify the optical basis. The computing device, for instance, may include an inertial measurement unit (IMU) that may produce a sensor basis for determining the orientation or position of the sensors. Thus, the sensor basis may serve to "cross-check" the optical basis such that correction may be made if an erroneous result is received by the optical basis. A variety of other basis techniques are also contemplated, further discussion of which may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
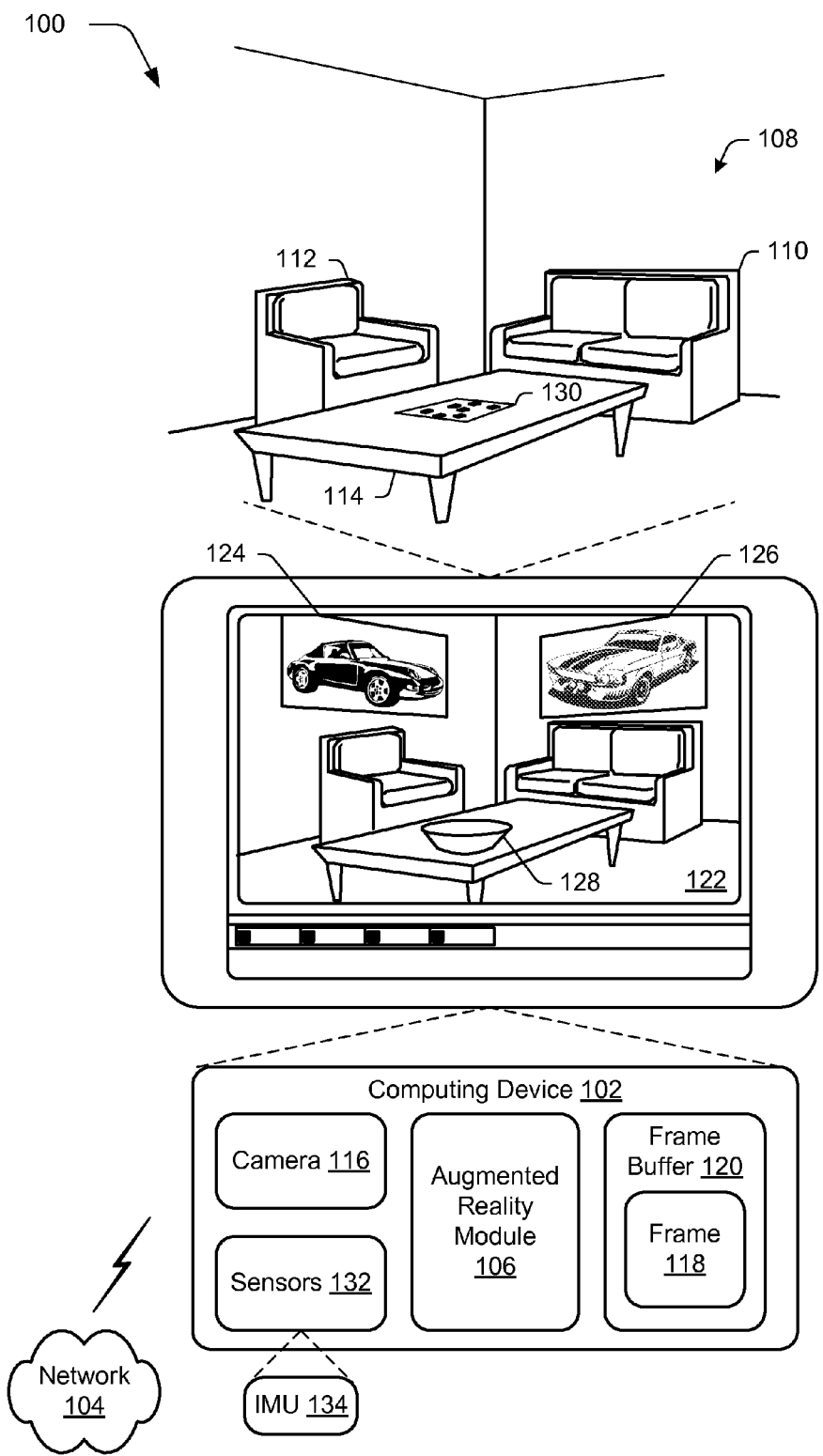
FIG. 1 is an illustration of an environment in an example implementation that is operable to employ augmented reality techniques described herein.

FIG. 1 is an illustration of an environment 100 in an example implementation that is operable to employ augmented reality techniques described herein. The illustrated environment 100 includes a computing device 102, which may be configured in a variety of ways. For example, although the computing device 102 is illustrated as a mobile communication device (e.g., tablet, wireless telephone), the computing device 102 may be configured in a variety of other ways. For instance, the computing device 102 may be configured as a computer that is capable of communicating over a network 104, such as a desktop computer, a mobile station, an entertainment appliance, a set-top box communicatively coupled to a display device, a game console, and so forth.

Accordingly, the computing device 102 may range from full resource devices with substantial memory and processor resources (e.g., personal computers, game consoles) to low-resource devices with limited memory and/or processing resources (e.g., traditional set-top boxes, hand-held game consoles). Additionally, although a single computing device 102 is shown, the computing device 102 may be representative of a plurality of different devices, such as a user-wearable helmet and game console, multiple servers utilized by a business to perform operations that provide a platform "in the cloud," a remote control and set-top box combination, and so on.

The computing device 102 is also illustrated as including an augmented reality module 106. The augmented reality module 106 is representative of functionality of the computing device 102 to augment a view of real-world surroundings of the computing device 102. In the illustrated example, for instance, the computing device 102 is illustrated as being physically present in a room 108 that has a couch 110, a chair 112, and a table 114 that are positioned in a corner of the room 108.

The computing device 102 includes a camera 116 that is configured to capture one or more images of the physical surroundings of the computing device 102, e.g., the room 108 in this example. These one or more images may be used to capture a view of the "reality" that is to be augmented, although other input devices are also contemplated such as microphones. The augmented reality module 106 may receive data from the camera 116 (e.g., the one or more images) to generate a frame 118, which is illustrated as being stored in a frame buffer 120 of the computing device 102.

The frame 118 may then be displayed by a display device 122 of the computing device 102, which although illustrated as part of a mobile communication device may assume a variety of configurations. In one or more implementations, the display device 122 may be included as part of a helmet and positioned for viewing by one or more of a user's eyes. Additionally, the display device 122 may or may not be partially transparent. For example, the display device 122 may be configured to display both the image captured by the camera 116 along with augmentations. In another example, the display device 122 may be configured to display the augmentations without the view of the image captured by the camera 116, but permit a view of the physical surroundings to be seen through at least a portion of the display device 122. Thus, the augmentation generated by the augmented reality module 106 may be displayed in a variety of ways.

In the illustrated example, the frame 118 displayed by the display device 122 includes an image captured by the camera 116. The frame 118 also includes a plurality of augmentations that were generated by the augmented reality module 106. Illustrated examples displayed by the display device 122 include first and second pictures 124, 126 that appear positioned on walls of the room 108 as well as a bowl 128 that appears to be placed on the table 114. Thus, the augmented reality module 106 may augment the view of reality displayed by the display device 122. It should be readily apparent that augmentations generated by the augmented reality module 106 may assume a variety of other forms, such as objects as part of a game and other changes to a view of the surroundings of a computing device 102.

To generate this view and know "where" to place to augmentations, the augmented reality module 106 may leverage a variety of techniques to determine an orientation and/or position of the computing device 102 in relation to the environment, e.g., the room 108 as illustrated. For example, the augmented reality module 106 may leverage one or more markers to determine how the computing device 102 is positioned, oriented, moved, and so on. These markers may take a variety of forms. For instance, the augmented reality module 106 may set one or more view points in the living room as markers and thus service as a basis to determine orientation and/or positioning, such as a corner of the table 114, orientation of the chair 112, and so on. Thus, the items in the room may act as a basis to determine where the computing device 102 is located within the room.

In another instance, the augmented reality module 106 may leverage a view of one or more augmented reality (AR) tags that are physically positioned within the surrounding environment of the computing device 102. An example AR tag 130 is illustrated as positioned on the table 114 in the living room 108. Although a single AR tag 130 is shown, a plurality of AR tags may be utilized in the environment. The example AR tag 130 (or other markers) may be used as a basis to determine depth (e.g., distance between the AR tag 130 and the camera 116), three-dimensional orientation of the computing device 102 with respect to the AR tag 130, and so forth.

For example, the AR tag 130 may include a pattern that may be recognized by the augmented reality module 106 to determine a distance from the AR tag 130 and/or an orientation of the computing device 102 in relation to the AR tag 130. In this way, markers may be leveraged by the augmented reality module 106 to determine "where" and "how" the computing device 102 is positioned in a physical environment. The augmented reality module 106 may use this determination as a basis to generate augmentations to be output for viewing by a user of the computing device 102.

The augmented reality module 106 may also leverage one or more sensors 132 to determine and verify a position and/or orientation of the computing device 102. For example, the sensors 132 may be configured as an inertial measurement unit (IMU), which may include a gyroscope, one or more accelerometers, a magnetometer, and so on including any combination thereof. These units may be used to generate an external basis with which to verify a basis generated using the optical marking techniques previously described. For example, a basis generated using the optical marking techniques described above that leverages the camera 116 may be evaluated for discrepancies using a basis generated by the one or more sensors, e.g., an IMU 134. In this way, the techniques may be used to determine an orientation and position of the computing device 102 in relation to its physical surroundings, further discussion of which may be found in relation to FIG. 2.

Generally, any of the functions described herein can be implemented using software, firmware, hardware (e.g., fixed logic circuitry), manual processing, or a combination of these implementations. The terms "module" and "functionality" as used herein generally represent hardware, software, firmware, or a combination thereof. In the case of a software implementation, the module, functionality, or logic represents instructions and hardware that performs operations specified by the hardware, e.g., one or more processors and/or functional blocks.

For example, the computing device 102 may include an entity (e.g., software) that causes hardware of the computing device 102 to perform operations, e.g., processors, functional blocks, and so on. The computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via the network 104. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
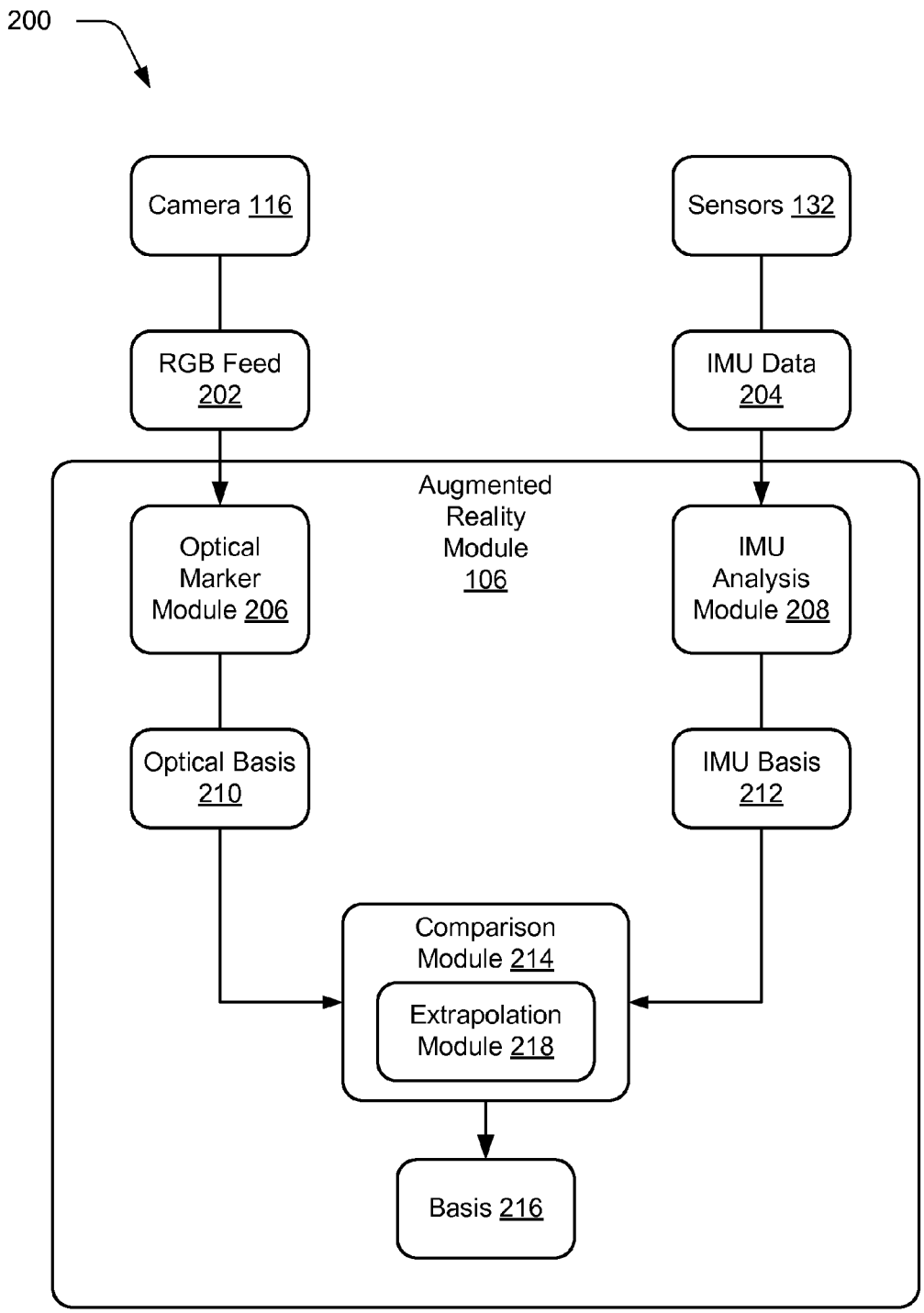
FIG. 2 is an illustration of a system in an example implementation showing an augmented reality module of FIG. 1 in greater detail as being employed for basis generation for a computing device that leverages both a camera and sensors.

FIG. 2 is an illustration of a system 200 in an example implementation showing the augmented reality module 106 of FIG. 1 in greater detail as being employed for basis generation for the computing device 102 that leverages both the camera 116 and the sensors 132. The augmented reality module 106 in this example receives a red/green/blue (RGB) feed 202 from the camera 116 and IMU data 204 from the sensors 132.

The augmented reality module 106 then processes the RGB feed 202 using an optical marker module 206 and the IMU data 204 using an IMU analysis module 208. This processing may be used to generate an optical basis 210 and an IMU basis 212, respectively, for determining orientation, position, and/or distance of the computing device 102 in a physical environment. A comparison module 214 may then be employed by the augmented reality module 106 to "cross check" the optical and IMU bases 210, 212.

For example, the comparison module 214 may receive the optical basis 210 and determine whether the optical basis 210 is consistent with the IMU basis 212. If the optical basis 210 is consistent with the IMU basis 212, the comparison module 214 may then output the basis 216. However, if the optical basis 210 is not consistent, the comparison module 214 may leverage an extrapolation module 218 to compare the optical basis 210 with a previous point in time, such as for a previous frame captured by the camera 116 (e.g., a previous optical basis 210), previous IMU data 204, and so forth. For instance, the extrapolation module 218 may use the last "good" optical basis 210 (e.g., verified using the comparison module 214) and use "current" IMU data 204 to predict a likely basis for the computing device 102.

By employing the camera 116 with the sensors 132 near simultaneously, these techniques may be used to generate a basis 216 having a higher degree of confidence that if performed separately. For instance, use of the optical basis 210 alone for the registration of a camera 116 location may not be robust in instances because some frames may fail to be classified correctly, which may cause jarring errors in a resulting augmented-reality display.

For example, the display of object that is used to augment the view of reality may suddenly flip around an axis, translate an unreasonable amount, and so forth. If the object is supposed to be fixed in space, for instance, this may suggest to the viewer that the viewer has moved, even when the viewer has not and thereby break the illusion that the object is included in the real world environment.

On the contrary, use of the IMU data 204 alone may not provide a particularly accurate basis function in some instances (e.g., over an extended period of time) due to drifting. However, the IMU data 204 may work to provide a metric by which to qualify the optical basis 210 and therefore the combination may be used to determine a basis with a higher degree of confidence.

Example Procedures

The following discussion describes augmented reality techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
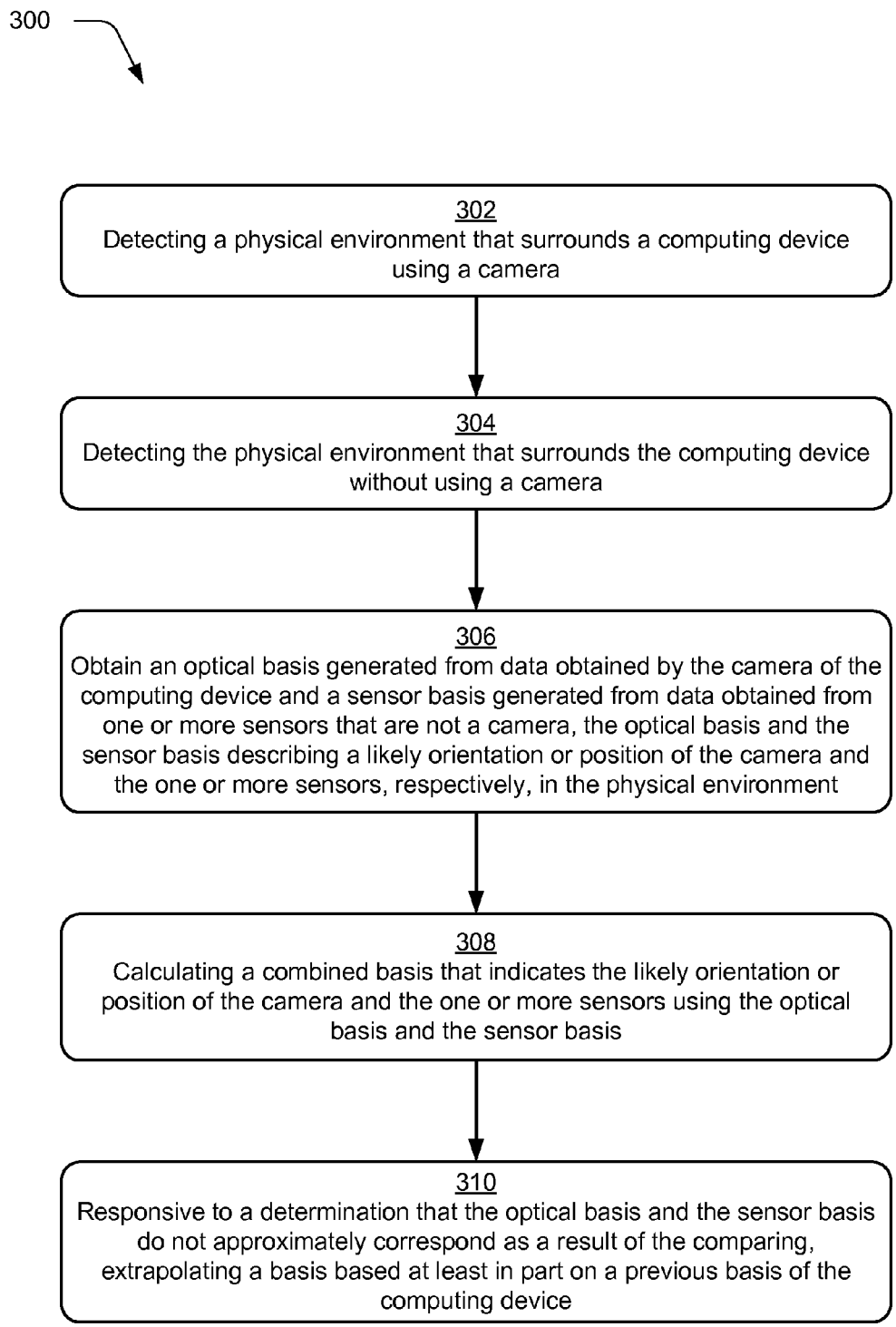
FIG. 3 is a flow diagram depicting a procedure in an example implementation in which a basis is calculated which is used to describe an orientation or position of at least a part of a computing device.

FIG. 3 depicts a procedure 300 in an example implementation in which a basis is calculated which is used to describe an orientation or position of at least a part of a computing device. A physical environment that surrounds a computing device is detected using a camera (block 302). The camera 116, for instance, may be used to capture images of a room 108. The physical environment is also detected without using a camera (block 304), such as by using one or more other sensors. As stated previously, a variety of sensors may be used such as one or more of a gyroscope, an accelerometer, a magnetometer, and so on. For example, a combination of these and other sensors may be packaged as part of an inertial measurement unit (IMU).

An optical basis is generated from data obtained by the camera of the computing device and a sensor basis is generated from data obtained from the one or more sensors that are not a camera. The optical basis and the sensor basis describe a likely orientation or position of the camera and the one or more sensors, respectively, in the physical environment (block 306). An augmented reality module 106, for instance, may detect one or more markers (e.g., AR tags 130) captured in an image taken by the camera 116. The augmented reality module 106 may then use these markers as a basis for determining an orientation and position of the camera 116, and consequently the computing device 102, in relation to the room 108. Likewise, one or more sensors 132 may also be used to determine a basis for determining the orientation or position.

A combined basis is calculated that indicates the likely orientation or position of the camera and the one or more sensors using the optical basis and the sensor basis (block 308). For example, a sensor basis (e.g., an IMU basis 212) may be used to verify the optical basis 210, such as to determine whether the position and/or orientation described by the optical basis 210 approximately corresponds to the sensor basis. In this way, the bases may be combined through the comparison to verify the calculations.

However, responsive to a determination that the optical basis and the sensor basis do not approximately correspond as a result of the comparing, a basis is extrapolated based at least in part on a previous basis of the computing device (block 310). The augmented reality module 218, for instance, may leverage an extrapolation module 218 to extrapolate a previously computed basis. A previous basis (e.g., a combined basis as described above, an optical basis for a previous frame, and so on) may be extrapolated based on other previous frames to determine a likely orientation or position. The extrapolation module 218 may also leverage "current" data, such as a recent input received from the sensors 132 in combination with a previous optical basis 210. A variety of other examples are also contemplated. This basis may then be used to generate an augmentation for viewing as part of an augmented-reality display, an example of which may be found in relation to the following figure.

Figure 4:
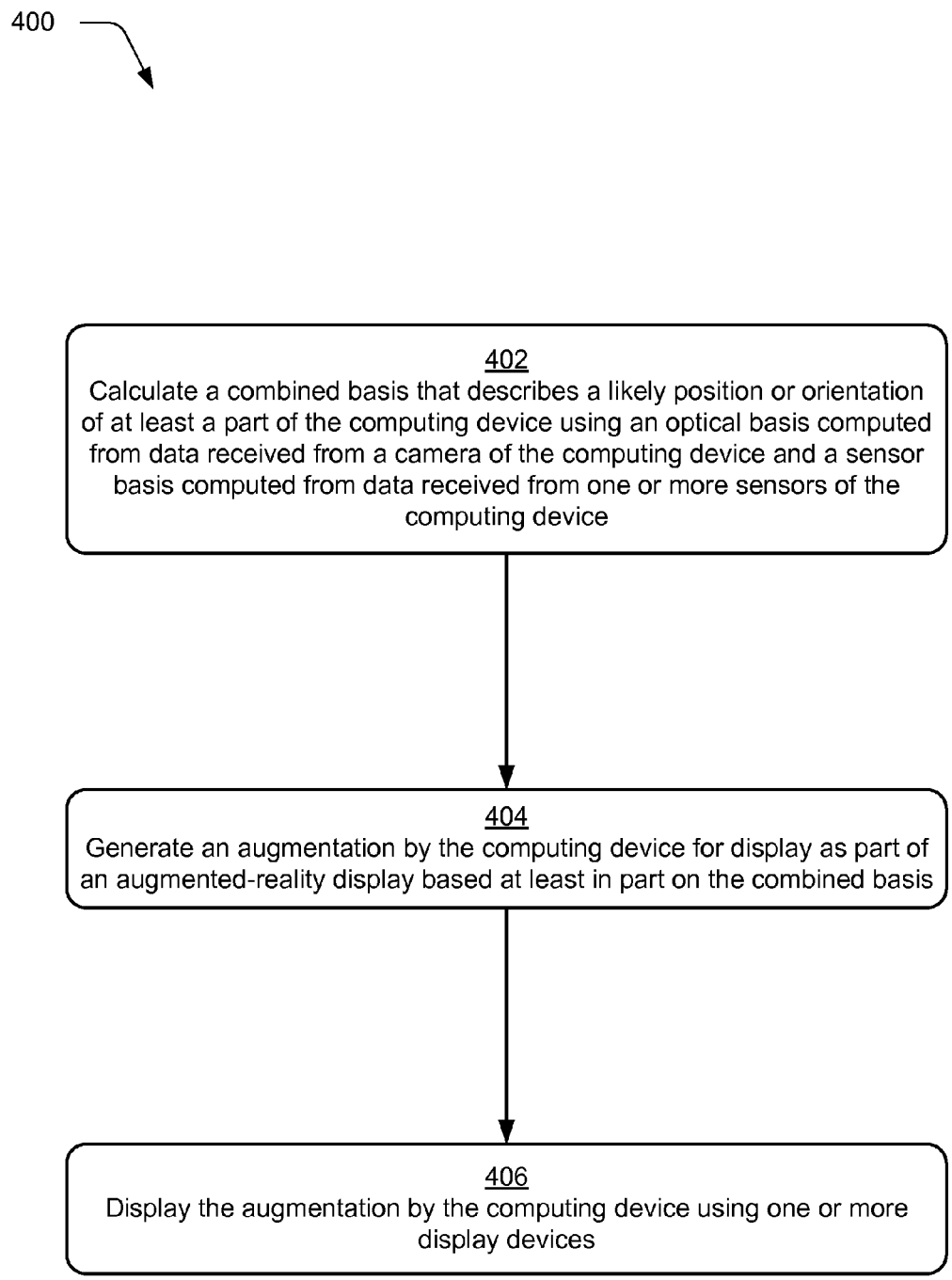
FIG. 4 is a flow diagram depicting a procedure in an example implementation in which an augmentation is generated for display as part of an augmented-reality display for output by a computing device.

FIG. 4 is a flow diagram depicting a procedure in an example implementation in which an augmentation is generated for display as part of an augmented-reality display for output by a computing device. A combined basis is calculated that describes a likely position or orientation of at least a part of the computing device using an optical basis computed from data received from a camera of the computing device and a sensor basis computed from data received from one or more sensors of the computing device (block 402). As previously described, the combined basis may be formed by verifying an optical basis with a sensor basis. The combined basis may also be formed in a variety of other ways, such as by averaging the bases, averaging confidence values, use of weighted averages, and so forth.

An augmentation is generated by the computing device for display as part of an augmented-reality display based least in part on the combined basis (block 404). A variety of different augmentations may be generated, such as objects to be viewed via a display device, directional audio, tactile feedback, and so forth.

The augmentation is displayed by the computing device using one or more display devices (block 406). Continuing with the previous example, augmentations may be displayed along with a view of a physical environment, an example of which is shown in FIG. 1 in which the display device 122 include first and second pictures 124, 126 that appear positioned on walls of the living room 108 as well as a bowl 128 that appears to be placed on the table 114 that otherwise is not included in the physical room 108 itself. In this way, the display may augment reality with additional information. Additionally, the display may be performed using a variety of different display devices, such as display devices integrated in a tablet or mobile phone, part of a user-wearable item (e.g., a helmet), a standalone display device as typically found on a desktop, part of a laptop or netbook, and so forth.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method, comprising:
   obtaining an optical basis generated from image data obtained by a camera of a computing device, the optical basis describing a likely orientation or position of the camera in a physical environment;
   obtaining a sensor basis generated from sensor data obtained from one or more sensors of the computing device, the sensor basis describing a likely orientation or position of the one or more sensors in the physical environment; and
   comparing the optical basis and the sensor basis to verify the orientation or the position of the computing device in the physical environment, the comparing comprising determining whether or not the orientation or the position described by the optical basis and the orientation or the position described by the sensor basis are consistent.

2. A method as described in claim 1, wherein the one or more sensors include an inertial measurement unit (IMU) that generates an IMU basis as at least part of the sensor basis, the IMU basis used to establish a higher degree of confidence to said verify the orientation or the position of the computing device in the physical environment.

3. A method as described in claim 1, wherein at least one of the one or more sensors is configured as a gyroscope, an accelerometer, or a magnetometer.

4. A method as described in claim 1, further comprising calculating a combined basis that indicates the likely orientation or position of the camera and the one or more sensors using the optical basis and the sensor basis.

5. A method as described in claim 1, further comprising generating an augmentation for display as part of an augmented reality display based at least in part on a current basis describing the likely orientation or position of the computing device in the physical environment.

6. A method as described in claim 1, further comprising, responsive to a determination that the optical basis and the sensor basis do not approximately correspond as a result of the comparing, extrapolating a current basis based at least in part on a previous basis of the computing device.

7. A method as described in claim 6, wherein the extrapolating is based at least in part on the previous basis and the obtained sensor basis.

8. A method as described in claim 7, wherein the previous basis is computed from a previous optical basis.

9. A method as described in claim 1, wherein the computing device includes a display device that is wearable by a user.

10. A method as described in claim 1, wherein determining whether the optical basis and the sensor basis are consistent comprises determining whether the optical basis and the sensor basis describe approximately a same orientation or position.

11. A method implemented by a computing device, the method comprising:
    comparing an optical basis and a sensor basis to verify an orientation or position of the computing device in a physical environment, the comparing comprising determining whether a likely orientation or position of a camera in a physical environment described by the optical basis and a likely orientation or position of one or more sensors in the physical environment described by the sensor basis are consistent; and
    responsive to a determination that the optical basis and the sensor basis are consistent as a result of the comparing, calculating a combined basis that describes the orientation or position of the computing device in the physical environment.

12. A method as described in claim 11, further comprising generating an augmentation for display as part of an augmented-reality display based at least in part on the combined basis, wherein the generated augmentation is configured as an object that appears to be added to a physical environment of the computing device.

13. A method as described in claim 12, further comprising displaying the augmentation by the computing device using one or more display devices.

14. A method as described in claim 11, wherein the one or more sensors of the computing device include a gyroscope, an accelerometer, or a magnetometer.

15. An apparatus, comprising:
a camera configured to capture image data;
an inertial measurement unit (IMU) configured to generate sensor data;
one or more modules that are configured to:
compute an optical basis from the image data and a sensor basis generated from the sensor data; and
compare the optical basis and the sensor basis to verify an orientation or position of the apparatus in a physical environment, the comparing comprising determining whether or not the orientation or the position described by the optical basis and the orientation or the position described by the sensor basis are consistent.

16. An apparatus as described in claim 15, wherein the inertial measure unit (IMU) includes a gyroscope, an accelerometer, and a magnetometer.

17. An apparatus as described in claim 15, further comprising:
a display device configured to be wearable by a user;
the one or more modules configured to:
calculate a combined basis that describes a likely orientation or position of the camera and the inertial measurement unit (IMU) in the physical environment; and
cause an augmented-reality display by the display device, the augmented-reality display including an augmentation generated based at least in part on the combined basis.

18. An apparatus as described in claim 17, wherein the likely orientation or position of the camera and the inertial measure unit (IMU) serve as a basis to determine an orientation or position of least one body part of a user.

19. An apparatus as described in claim 17, wherein the augmented-reality display includes the augmentation and an image captured using the camera.

20. An apparatus as described in claim 15, further comprising a housing that includes the one or more modules and that is configured as a tablet or a wireless phone.

\* \* \* \* \*